US010285528B2

(12) United States Patent
Upston et al.

(10) Patent No.: US 10,285,528 B2
(45) Date of Patent: May 14, 2019

(54) CITRUS LID FOR BLENDER

(71) Applicant: BREVILLE PTY LIMITED, Alexandria (AU)

(72) Inventors: Greg Upston, Ridgewood (AU); Richard Hoare, Lane Cove (AU); Scott Brady, Alexandria (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 190 days.

(21) Appl. No.: 15/507,240

(22) PCT Filed: Aug. 28, 2015

(86) PCT No.: PCT/AU2015/000523
§ 371 (c)(1),
(2) Date: Feb. 27, 2017

(87) PCT Pub. No.: WO2016/029252
PCT Pub. Date: Mar. 3, 2016

(65) Prior Publication Data
US 2017/0245668 A1   Aug. 31, 2017

(30) Foreign Application Priority Data

Aug. 29, 2014 (AU) ............................... 2014903434

(51) Int. Cl.
*A47J 19/02*  (2006.01)
*A47J 36/06*  (2006.01)
*A47J 43/07*  (2006.01)
*A23N 1/00*  (2006.01)

(52) U.S. Cl.
CPC ............. *A47J 19/02* (2013.01); *A47J 19/022* (2013.01); *A47J 36/06* (2013.01); *A47J 43/0716* (2013.01); *A23N 1/003* (2013.01)

(58) Field of Classification Search
CPC ......... A47J 19/02; A47J 19/022; A23N 1/003; A23L 2/06
USPC .................... 99/501, 503, 506, 508
See application file for complete search history.

(56) References Cited

U.S. PATENT DOCUMENTS

| | | | |
|---|---|---|---|
| 1,563,413 A | 12/1925 | Whitcomb | |
| 2,087,979 A | 7/1937 | Kennedy | |
| 2,269,853 A | 1/1942 | Knapp | |
| 4,125,064 A * | 11/1978 | Ackeret | A47J 19/022 99/508 |
| 5,193,447 A * | 3/1993 | Lucas | A47J 19/02 99/506 |

(Continued)

FOREIGN PATENT DOCUMENTS

| | | |
|---|---|---|
| CN | 1835698 A | 9/2006 |
| CN | 202277203 U | 6/2012 |

(Continued)

OTHER PUBLICATIONS

International Search Report and Written Opinion for PCT/AU2015/000523, dated Sep. 14, 2015.

(Continued)

*Primary Examiner* — Reginald Alexander
(74) *Attorney, Agent, or Firm* — Marshall, Gerstein & Borun LLP

(57) ABSTRACT

A lid for a blender jug incorporated a citrus juicer that is capable of discharging into the interior of the jug.

12 Claims, 10 Drawing Sheets

(56) References Cited

U.S. PATENT DOCUMENTS

| | | | |
|---|---|---|---|
| 6,070,519 A | 6/2000 | Sham et al. | |
| 6,363,837 B1 | 4/2002 | Sham et al. | |
| 7,337,711 B2 * | 3/2008 | Holcomb | A47J 19/022 |
| | | | 99/506 |
| 2003/0005832 A1 | 1/2003 | Wang et al. | |
| 2011/0219959 A1 * | 9/2011 | Hauser | A47J 19/022 |
| | | | 99/508 |

FOREIGN PATENT DOCUMENTS

| | | |
|---|---|---|
| EP | 1 611 823 A2 | 1/2006 |
| GB | 2184346 A | 6/1987 |

OTHER PUBLICATIONS

International Preliminary Report on Patentability for PCT/AU2015/000523, dated Feb. 28, 2017.
Extended European Search Report issued in European Patent Application No. 1583483.0, dated Apr. 4, 2018.
First Office Action issued in Chinese Patent Application No. 201580058441.X, dated May 28, 2018.

* cited by examiner

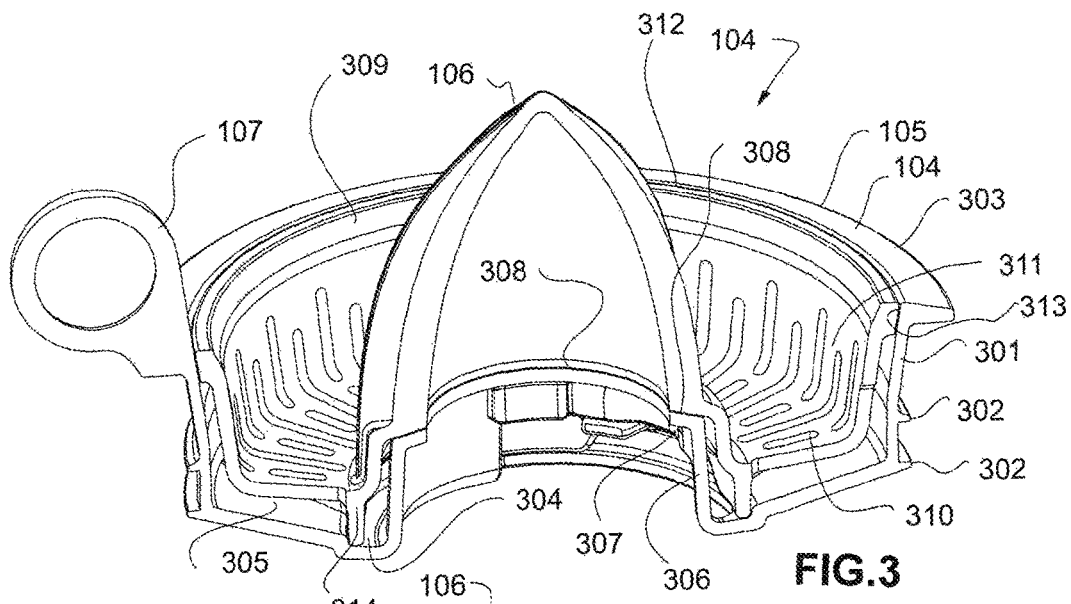
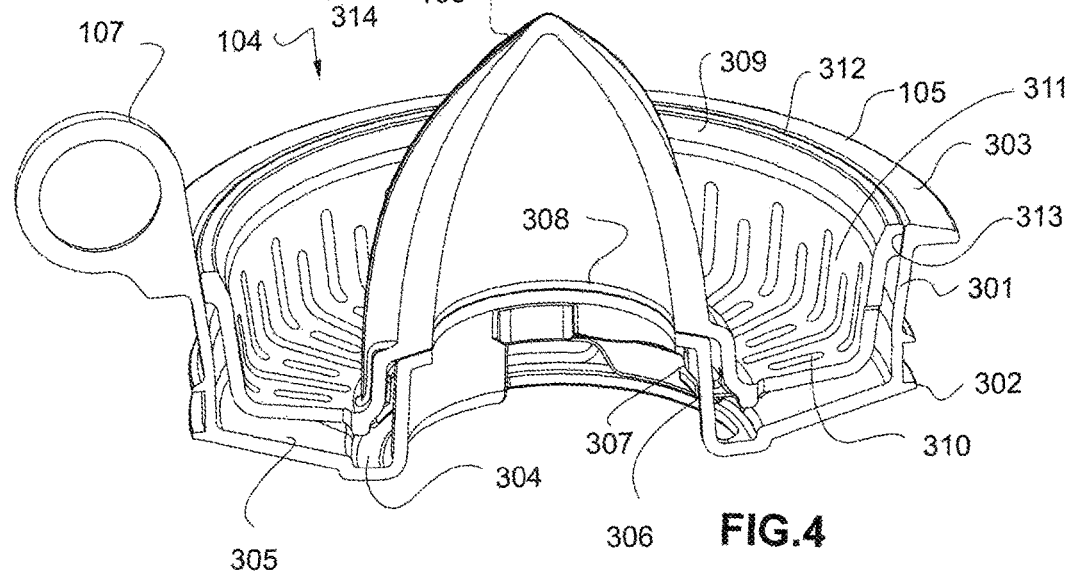

CITRUS LID FOR BLENDER

FIELD OF THE INVENTION

The invention pertains to lids for blenders and more particularly to a lid with citrus juicing functionality.

BACKGROUND OF THE INVENTION

The term "blender" is used to refer to a domestic or commercial countertop device having a square, round or other jug that is removably mounted on a motorised base. The motor in the base provides rotating power to a blade assembly located in the jug. Blenders of this type are well known, for example, appearing on the applicant's web site www.breville.com.au. When the blades of a blender are operating, liquids in the jug are propelled up the inner walls of the jug and a lid is required to prevent those liquids from spilling.

Users wishing to add ingredients to a jug while the lid is on sometimes have the option of removing a portion of the lid, such as a central measuring cap.

Users wishing to add a fresh citrus juice to the contents of a blender jug will normally juice the citrus fruit in a separate device or appliance and add the juice to the blender jug, either by removing the lid or a portion of it.

OBJECTS AND SUMMARY

It is an object of the disclosed technology to provide a lid with citrus juicing functionality.

Accordingly, there is provided a lid comprising an outer part and an inner part. The outer part makes a sealing engagement with the jug and supports the inner part above it. The inner part comprises a juicing auger.

BRIEF DESCRIPTION OF THE DRAWING FIGURES

In order that the invention be better understood, reference is now made to the following drawing figures in which:

FIG. 3 is a cross sectional view of the lid shown in FIGS. 1 and 2.

FIG. 4 is a cross sectional view of the lid shown in FIGS. 1 and 2.

DETAILED DESCRIPTION

Figure 1:
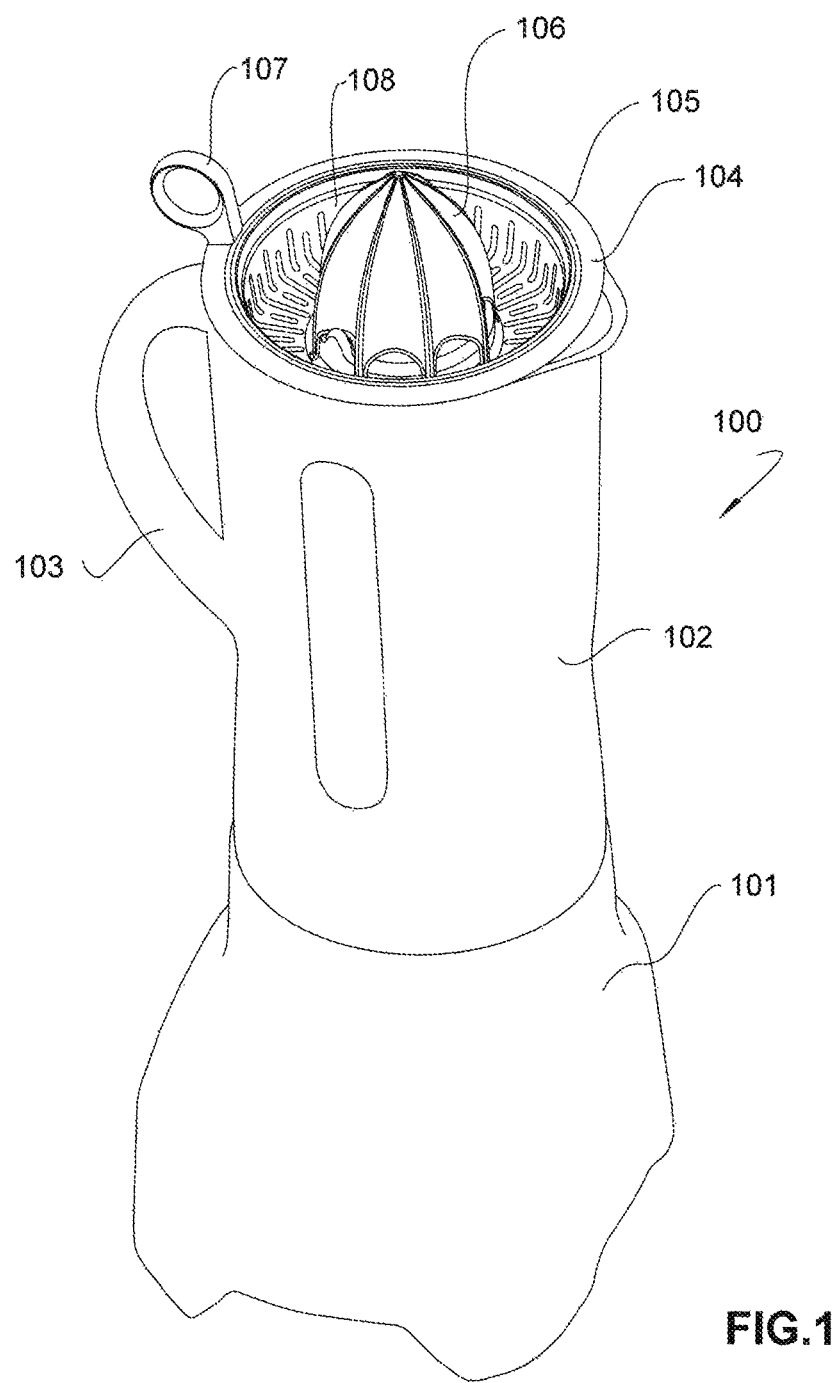
FIG. 1 is a perspective view of a blender with a citrus juicing lid.

As shown in FIG. 1, a blender 100 has a base 101 within which is an electric motor. The motor drives a blade assembly located in the blender's jug 102. The jug 102 has a lid 104 and an optional handle 103. The lid 104 has an outer part 105 with peripheral seals that engage the jug 102 typically against an interior surface. The lid 104 also has nested within it an inner part 108 with or forming a citrus juicing auger 106. In this example, the outer part has a pull ring 107 for withdrawing the lid 104 from the jug 102.

Figure 2:
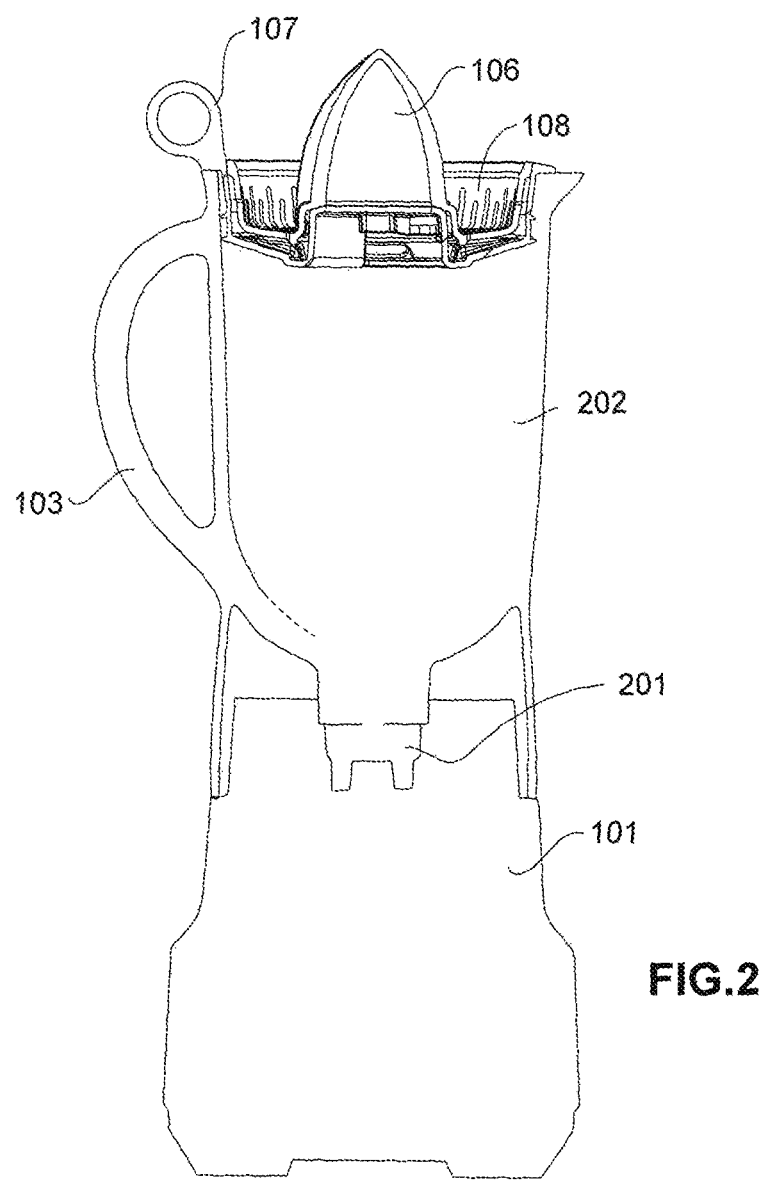
FIG. 2 is a cross sectional view of the blender and lid shown in FIG. 1.

As shown in FIG. 2, a lower part of the jug 102 comprises a rotating coupling 201 that engages a cooperating coupling associated with the base's motor. In this example the inner and outer parts engage one another with a bayonette-like attachment. The inner part with the auger 106 rotates relative to the outer part and in doing so, allows or blocks the flow of juice from the lid to the interior of the jug 202.

As shown in FIGS. 3 and 4, the outer part 105 of the lid 104 comprises a generally cylindrical (or other shaped) sidewall 301 having or supporting one or more circumferential seals retaining ribs 302 that conform to the jug. An elastomeric seal fits within the ribs. The upper part of the jug sealing sidewall 301 terminates in an optional radially extending flange 303 with an underside that abuts the upper rim of the jug when the lid is in place. In this example, the upper rim 303 carries an integral pull ring 107. The floor of the outer part 105 features at its lowest point, a circular collection trough 304. The floor 305 tapers or slopes down from the sidewall 301 toward the trough 304 so that juice runs toward and is collected in the trough 304. Radially inward of the trough 304 and above it, the floor forms a generally cylindrical throat 306 having an inwardly directed upper rim 307, the rim having a central opening 308. The rim 307 may support an underside surface 308 of the juicing auger 106. The throat can support the auger from below and provides features that cooperate with the inner part as will be explained.

The inner or auger part of the lid 108, 309 comprises or contains a centrally located juicing auger or cone 106. A continuous and perforated juicing floor 310 and optional perforated upright sidewall 311 extend between the juicing auger 106 and the inner sidewall, in some embodiments extending to the upper rim 312 of the outer part. In preferred embodiments, the outer surface 313 of the rim 312 pilots against the interior of the sidewall 301 of the outer part 104. The inner part 104 also has a descending, generally cylindrical collar 314 comprising spaced apart tabs or protrusions 340 that extend into the trough 304 and act to regulate fluid flow.

Figure 5:
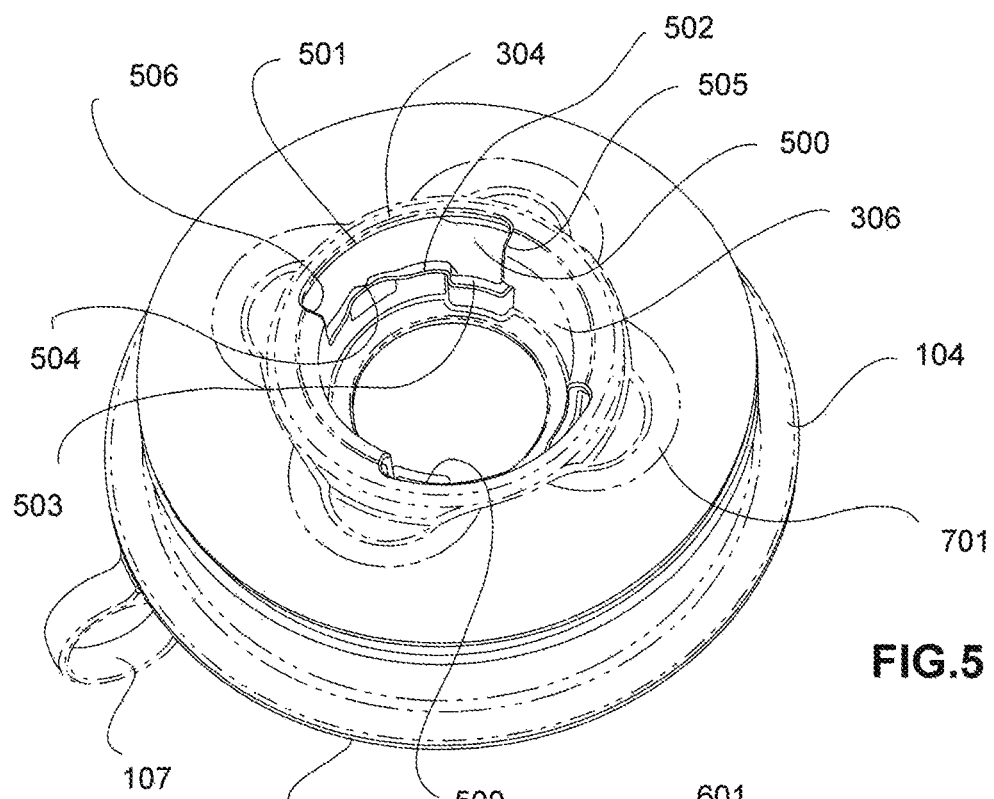
FIG. 5 is an underside perspective view of the outer part of the lid depicted in FIG. 1.

As shown in FIG. 5, an arcuate opening or gateway 500 is formed through the outer part 104 in the area of the throat 306 and trough 304. The lowest edge 501 of the gateway 500 extends into the trough 304 and allows the trough to drain into the interior of the jug 102. A lower edge 502 of the gateway 500 has features that cooperate with the inner part. These features include one or more vertical channels or female bayonette features 503 and a detent feature 504. The gateway 500 has, for example, one lateral edge 505 adjacent to the vertical channel 503 and another lateral edge 506 that limits the rotational movement of the inner part. One or more and in this case, two identical gateway openings 500 are provided in the area of the throat 306, diametrically opposite to one another.

Figure 6:
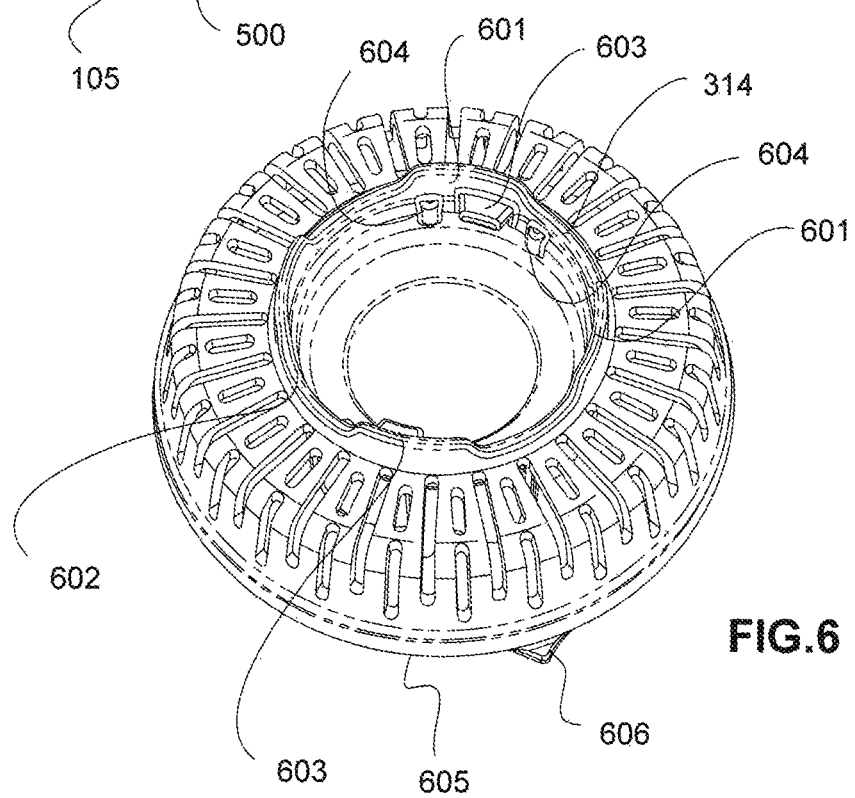
FIG. 6 is an underside perspective view of the underside of the inner part of the lid shown in FIG. 1.

As shown in FIG. 6, the collar 314 of the inner part has at least one, but in this example, four vertical extensions or tabs 601 between which are located flow recesses 602. The tabs cooperate with the gateways 500.

Radially inward of the collar 314 and located on an inner surface of the lower part are formed a pair of inwardly extending locating fingers or male bayonette features 603.

The locating fingers 603 are adapted to be received by and travel along the vertical channels 503 until the tabs 601 of the inner part contacts the trough 304 or otherwise reaches the lower limit of travel whereupon the auger can rotate to open and close the gateways 500. Male detent and alignment features 604 are located so that the locating finger 603 is between them. An upper and outer rim 605 of the inner part may have one or indicators, being in this example protruding or extending pointers 606 to facilitate alignment with textual or graphic markings on the upper rim of the outer part.

Figure 7:
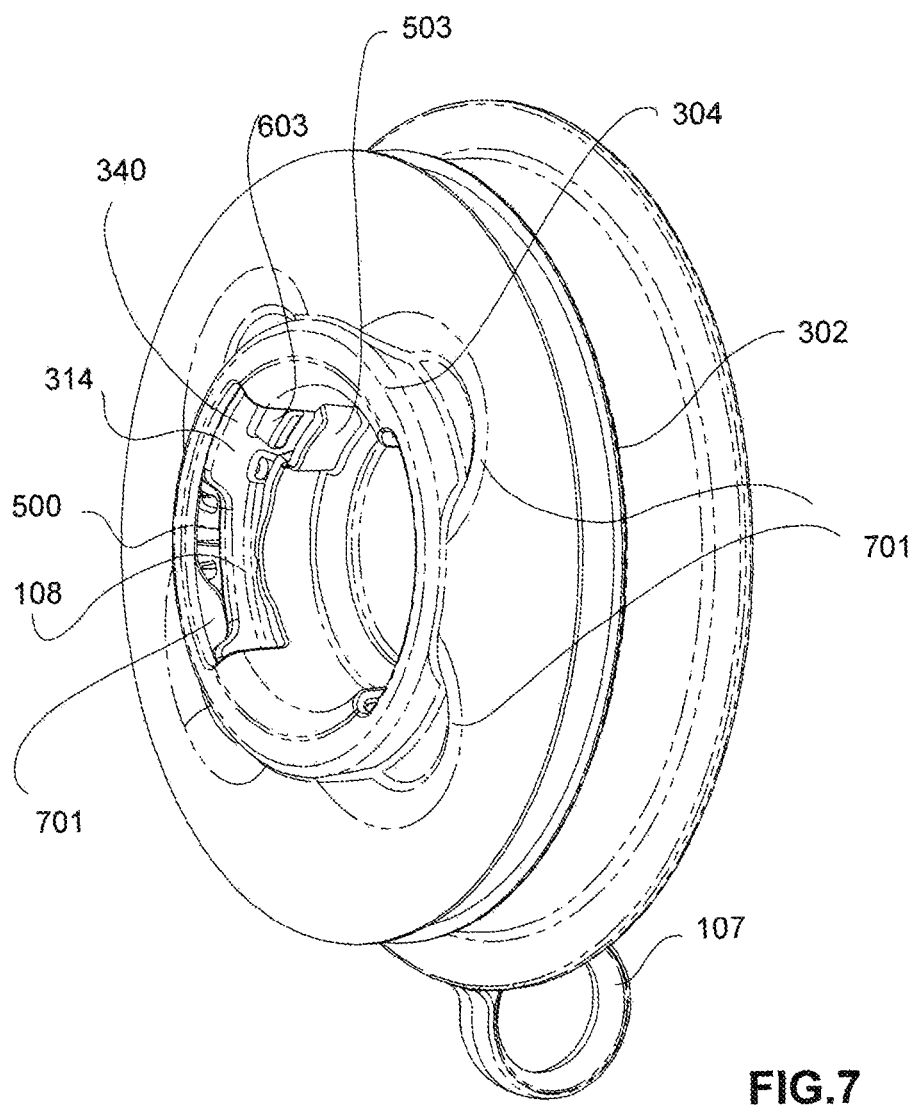
FIG. 7 is an underside perspective view of the lid shown in FIG. 1, in an initial position.

As shown in FIG. 7, the inner part 108 is installed onto the outer part by aligning the locating fingers 603 with the vertical channels 503. In this orientation, the inner part can be lowered fully into the outer part and which location the finger 603 is clear of the channel 503.

Figure 8:
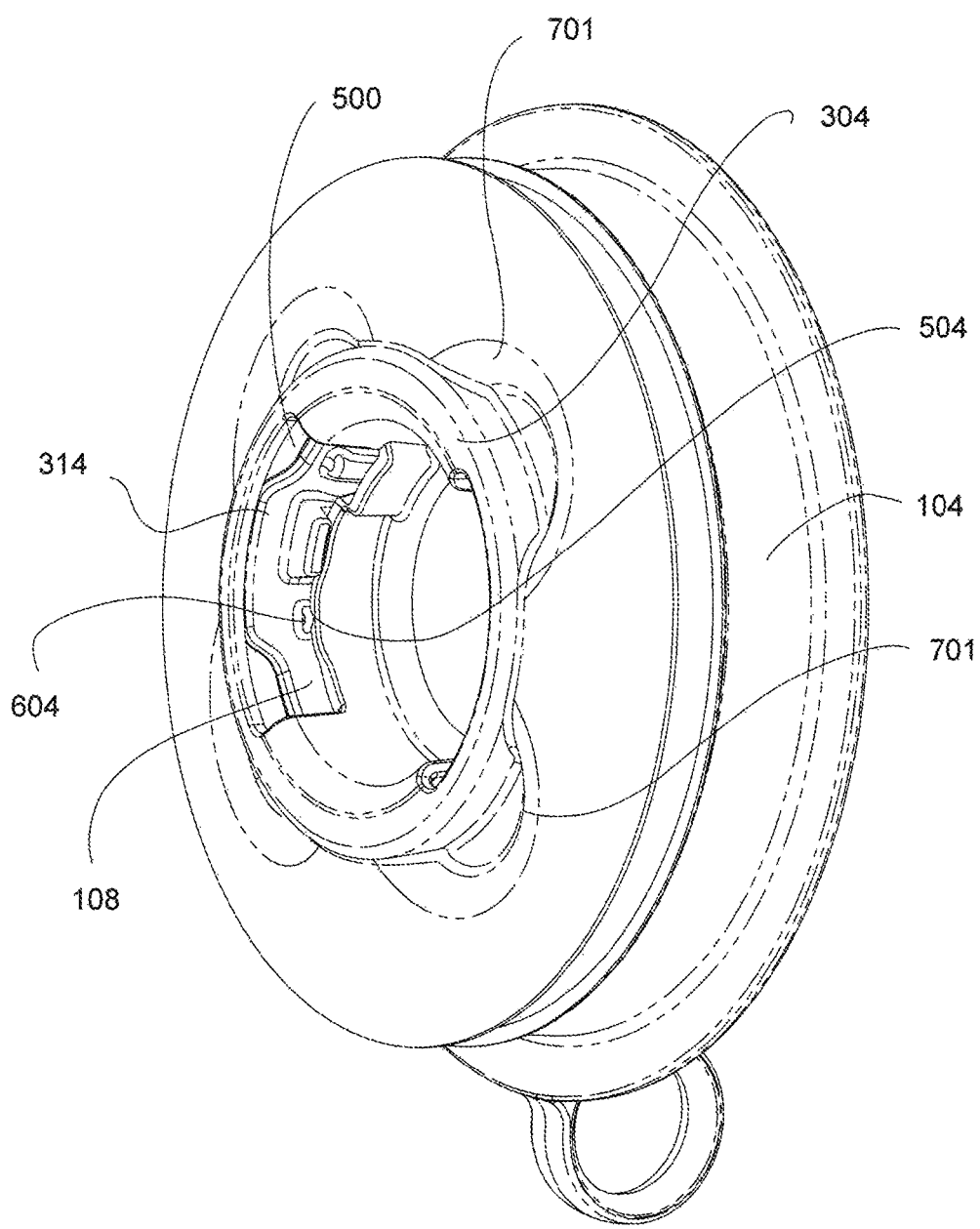
FIG. 8 illustrates the structure shown in FIG. 7 in an intermediate or closed position.

As shown in FIG. 8, rotating the inner part 108 relative to the outer part 104 causes a first male detent feature 604 to engage the cooperating detent feature 504 formed on the lower edge of the opening 500. In this orientation, liquid flow from the upper part into the interior of the jug is blocked by the spaced apart extensions on the collar 314 of the inner part 108. As suggested by FIGS. 7 and 8, the upper side of the floor of the outer part 104 comprises, raised portions or mounds 701 that define channels that promote flow toward the gateways. The raised portions or mounds 701 partially define (between them) the gateways 500 through which liquid can travel downwardly and out of the lid when the gateways are not blocked by the extensions of the collar 314.

Figure 9:
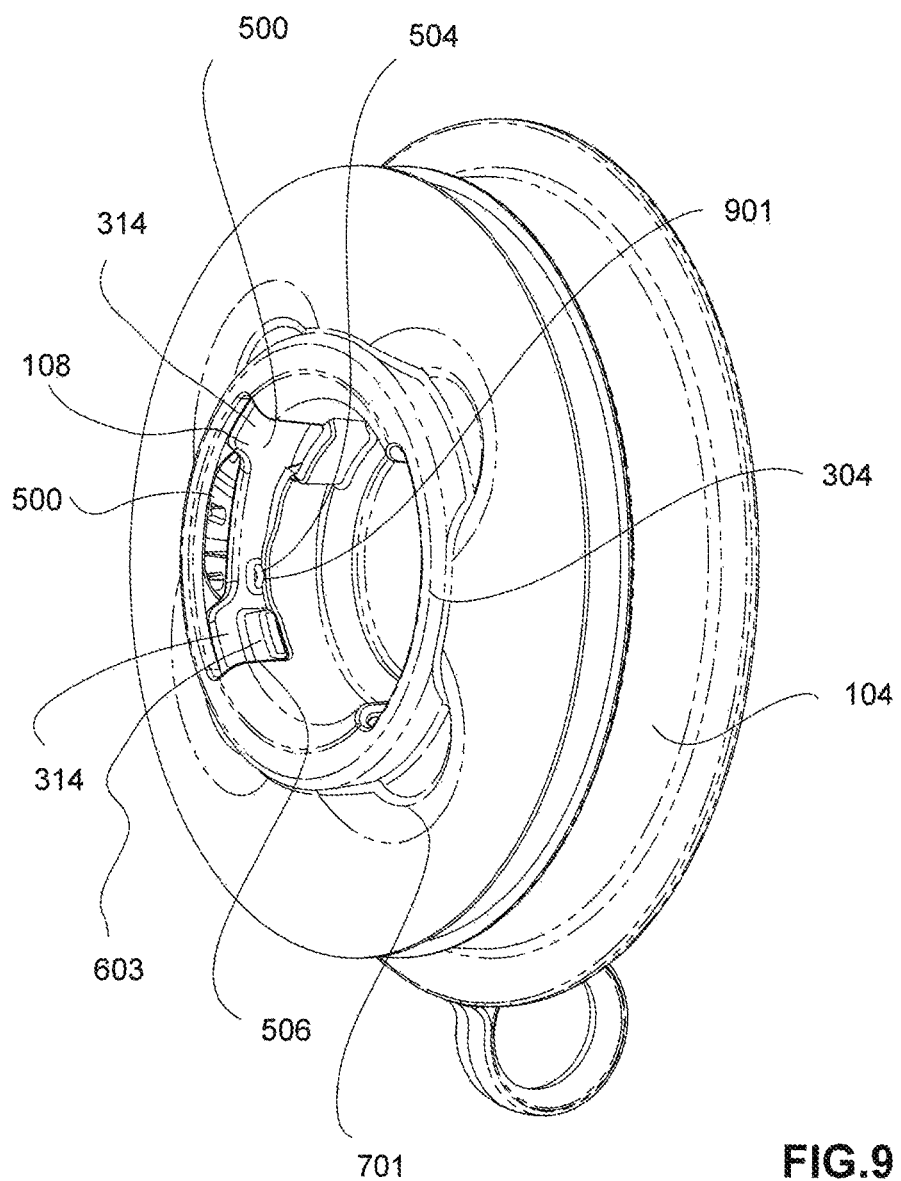
FIG. 9 is an underside perspective of the lid depicted in FIG. 7, in an open position.

Thus, as shown in FIG. 9, when the inner part 108 is rotated, the gateways 500 that were blocked or covered by tabs 314 are exposed or cleared and liquid can flow out of the trough 304, past the tabs or extensions 314 and down into the interior of the jug. In this open position, a second detent feature 901 of the inner part engages the detent feature 504 on the lower edge of the opening 500. A lateral edge of the locating finger 603 abuts a lateral edge 506 of the through opening 500 limiting the extent of rotational movement of the inner part.

Figure 10:
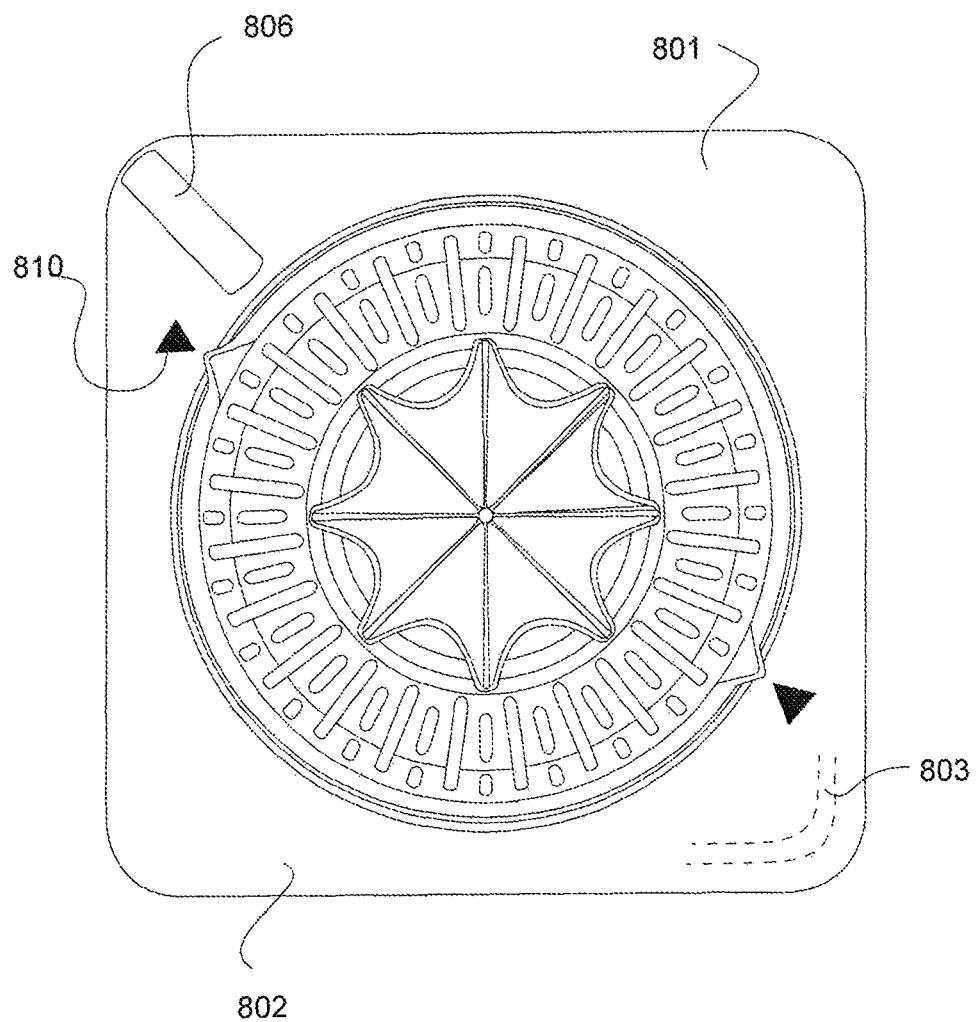
FIG. 10 is a top plan view of a square lid incorporating a citrus juicer.

As shown in FIG. 10, the construction of a citrus juicing lid for a blender is not limited by the shape of the jug on to which the lid is fitted. In the example of FIG. 10, the auger mechanism previously described is fitted into a generally square lid for a square jug (with rounded corners). In this example, the round flange 303 shown in FIGS. 3 and 4 is essentially replaced with a square flange 802. Sealing with the jug is accomplished on a rim 803 of the flange. The upper surface of the flange can have auger alignment markings 810.

Figure 11:
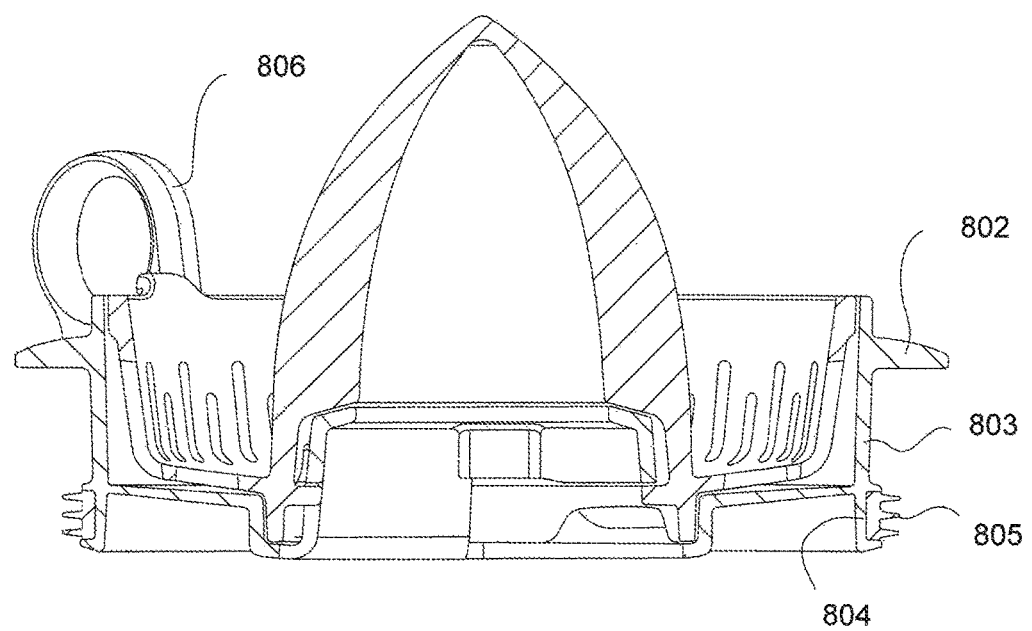
FIG. 11 is a cross section of the device depicted in FIG. 10.

As shown in FIG. 11, a sidewall or rim 803 extending below the flange 802 has a peripheral groove 804 that carries the peripheral seal 805. In this example, the ring-like pull 806 is carried on an upper surface of the square flange 802, preferably in one of the corners and directed toward the centre of the lid as suggested by FIG. 10.

Figure 12:
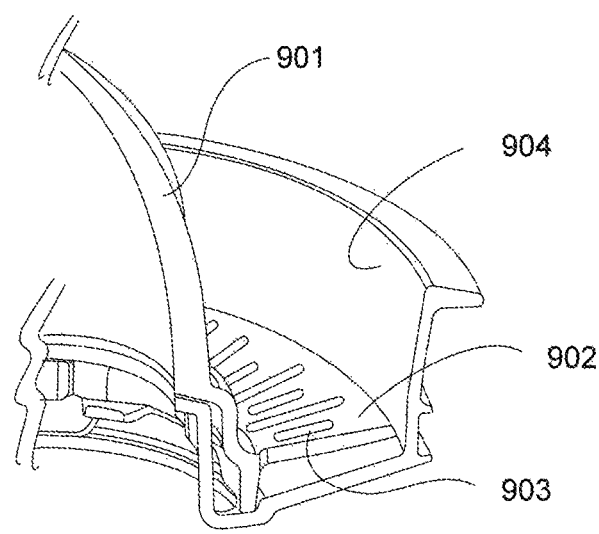
FIG. 12 is a perspective view, sectioned to illustrate an alternate inner part or juicing auger.

As shown in FIG. 12, an inner part or juicing auger 901 has a surrounding, generally flat or angled juicing floor 902 lacking the upright sidewalls depicted in FIGS. 3 and 4. In this example, the juicing floor 902 has an array of perforations 903 and extends to the inside diameter 904 of the cylindrical sidewall.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

What is claimed is:

1. A lid device for a blender having a jug, the lid comprising:
   an outer part with a sidewall having a circumferential seal;
   the outer part having a juice collecting trough, the trough having a gateway through which juice can flow downwardly out of the lid;

a juicing auger located within the sidewall and above the trough, the auger having around it a perforated juicing floor;

the auger being rotatable relative to the trough and having below it a tab that covers the gateway in a first auger orientation and uncovers the gateway in a second auger orientation.

2. The device of claim 1, wherein:

the trough is surrounded by a second sidewall in which is formed the gateway.

3. The device of claim 1, wherein:

a cylindrical throat is located radially inward of the trough, the throat having a vertical channel that receives an inward extending locating finger.

4. The device of claim 1, wherein:

the outer part and the juicing auger having between them, male and female detent features.

5. The device of claim 1, wherein:

the juicing auger carries a pointer and the outer part has graphic markings that align with the pointer.

6. The device of claim 1, wherein:

the juicing floor has a sidewall.

7. The device of claim 1, wherein:

the auger has below it a rim that carries the tab.

8. The device of claim 1, wherein:

the trough is surrounded by spaced apart raised portions that define channels that lead to the trough.

9. The device of claim 3, wherein:

a rotation of the auger relative to the outer part is limited by the locating finger.

10. The device of claim 4, wherein:

the male and female detent features correspond to open and closed orientations of the auger.

11. The device of claim 1, wherein:

the outer part further comprises a flange that cooperates with an upper rim of a jug.

12. The device of claim 1, wherein:

the flange is square.

* * * * *